United States Patent [19]
Nigg et al.

[11] 3,717,215
[45] Feb. 20, 1973

[54] CROSS-COUNTRY VEHICLE

[75] Inventors: Russell L. Nigg, Troy, Mich.; Guy R. Olinger, Dallas, Tex.

[73] Assignee: The United States of America as represented by the Secretary of the Army

[22] Filed: Nov. 30, 1970

[21] Appl. No.: 93,678

[52] U.S. Cl. ............... 180/14 R, 180/24.02, 180/41, 280/81 R, 280/474, 280/492
[51] Int. Cl. ................................................ B60d 7/00
[58] Field of Search.......... 180/14 R, 14 B, 24, 24.02; 280/474, 492, 494, 81

[56] References Cited

UNITED STATES PATENTS

| | | | |
|---|---|---|---|
| 3,183,991 | 5/1965 | Gamaunt | 180/24 |
| 3,285,621 | 11/1966 | Turner, Sr. | 280/81 R |
| 3,502,165 | 3/1970 | Matsukata | 180/24.02 X |
| 3,351,037 | 11/1967 | Meili | 180/24 X |
| 2,933,143 | 4/1960 | Robinson et al. | 180/14 R |

Primary Examiner—Leo Friaglia
Assistant Examiner—John P. Silverstrim
Attorney—Harry M. Saragovitz, Edward J. Kelly, Herbert Berl and John F. Schmidt

[57] ABSTRACT

A three-axle vehicle is provided in two parts, two axles under the forward part and one under the rear part, and the two parts are articulated so as to have pitch and roll capabilities of the parts relative to each other. These capabilities are negatived by two truss structures securable between the parts, one on each side of the roll axis and each truss comprising a triangle of which one side is the structure of one of the two parts. A tension member for each ground-engaging member of the intermediate axle keeps the ground-engaging members off the ground when the two parts are rigidized by the trusses, so that a tire or wheel may be taken from the intermediate axle to replace a damaged tire or wheel on either of the front or rear axles. Rigidized, the vehicle functions as a four-wheel, two-axle type.

14 Claims, 6 Drawing Figures

PATENTED FEB 20 1973 3,717,215

INVENTORS
Russell L. Nigg
Guy R. Olinger
BY
H.M. Saragovitz, E.J. Kelly,
H. Berl & John F. Schmidt

ATTORNEYS

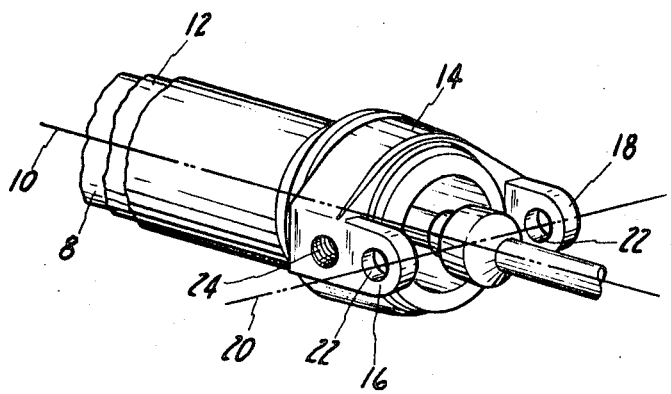
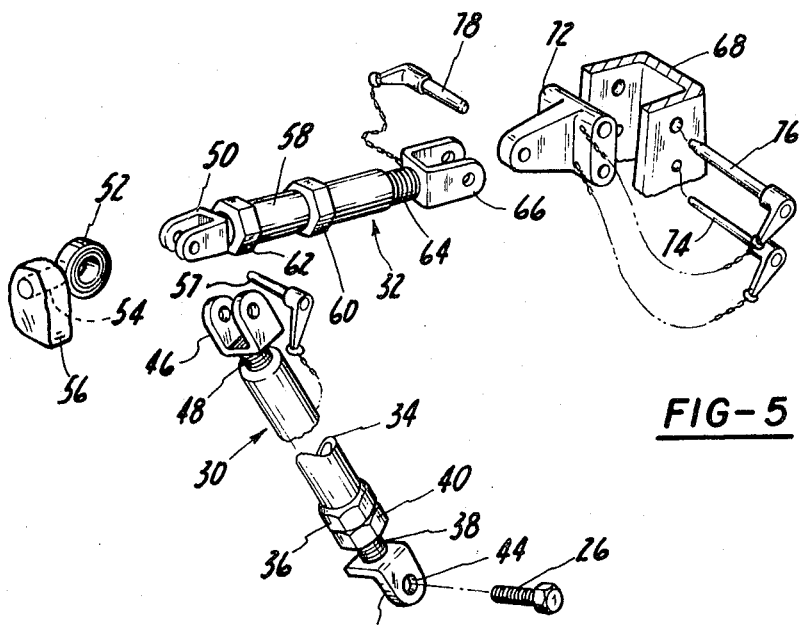
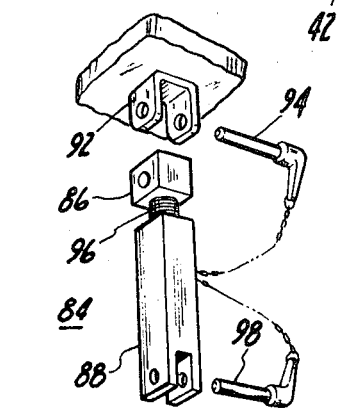
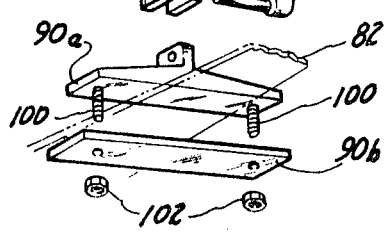

CROSS-COUNTRY VEHICLE

BACKGROUND OF THE INVENTION

1. Field of the Invention

This invention is in the field of vehicles capable of operating off conventional highways, often termed "cross country" vehicles, and especially to military vehicles having such capabilities, such as U.S. Pat. No. 3,183,991, issued May 18, 1965 to Roger L. Gamaunt.

2. Prior Art

There are numerous articulated, cross-country vehicles in the prior art, but we know of none having either the structure or the performance capabilities of a vehicle made according to this invention.

SUMMARY OF THE INVENTION

The invention is an improvement on the vehicle disclosed in the above-identified patent to Roger Gamaunt. That patent discloses an articulated, two-part three-axle vehicle having pitch and roll capabilities. This invention adds a feature which rigidizes the two parts of the structure to make it act as one, thus eliminating the pitch and roll capabilities but also taking the load off the intermediate axle of the three-axle vehicle. This is done by means of a truss comprising two members which, with the help of vehicle structure, form a triangle; desirably, one such truss is disposed on each side of the roll axis. An added feature holds the wheels of the intermediate axle off the ground by a tension member of which one end is secured to the underside of the vehicle body above the wheel and the other end engages the spring which resiliently suspends the wheel from the body.

It is accordingly an object of the invention to provide a two-part, articulated, three-axle vehicle having pitch and roll capabilities with means engageable between the two parts to make them rigid so as to function as one structure. It is another object of the invention to take the weight off the intermediate axle of such a rigidized vehicle whereby it functions as a two-axle vehicle. Yet another object is to hold either or both intermediate axle wheels off the ground when the two parts of the vehicle have been rigidized so as to function as a two-axle vehicle, enabling use of an intermediate axle wheel as a spare to replace a damaged wheel on the front or rear axle.

In the Drawings:

FIG. 4 is an enlarged view of a detail of the yoke of the articulation linkage.

FIG. 5 is an exploded view of one of the rigidizing triangles, showing details of the several elements which go into the formation of such a triangle.

FIG. 6 is an exploded view of one of the tension members provided to secure a ground-engaging member against bias toward the ground by its spring suspension.

DESCRIPTION IN DETAIL

Figure 1:
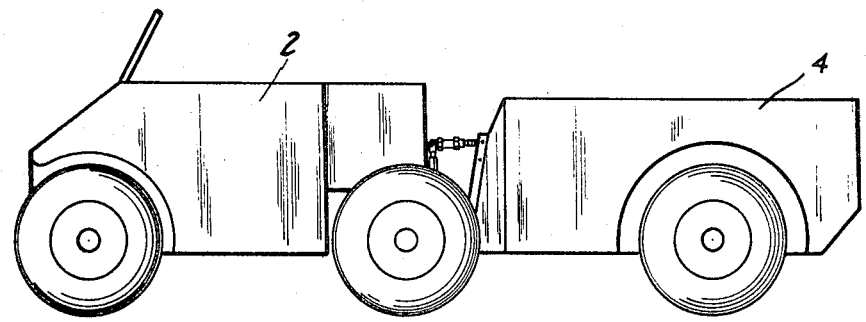
FIG. 1 is a side elevation view of a vehicle embodying the invention.

The basic vehicle on which the invention is herein shown is essentially the vehicle disclosed in the above-identified U.S. Pat. No. 3,183,991. One minor exception is the illustration herein of a semi-elliptic spring to suspend the intermediate axle, as will be detailed below.

The drawings show a three-axle vehicle having a forward part 2 and a rear part 4 connected by articulation linkage indicated generally at 6. Linkage 6 here shown is generally and in principle the same as the articulation linkage illustrated and described in the Gamaunt patent, so the description thereof will not be detailed here. It will be noted that FIG. 4 of this invention disclosure is substantially a reproduction of FIG. 7 of the patent except that we have added a tapped hole as will be described below.

Gamaunt's basic vehicle provides for pitch and roll of the forward and rear parts 2 and 4 relative to each other, both of these capabilities being provided by articulation linkage 6. As the patent indicates, the cylindrical element here shown as element 8 is secured in any suitable manner to the underside of the forward part 2 and provides the roll axis 10 about which intermediate element 12 oscillates. A collar or flange 14 is secured to the rearmost extremity of intermediate element 12 and bears lugs 16 and 18 at opposite ends of a diameter, which lugs provide the pitch axis 20 by means of openings 22.

In Gamaunt's vehicle, there is no need for a substantial spacing between lugs 16 and 18. The distance between the lugs is simply a function of the physical size of cylindrical elements 8 and 12, which is determined by the functional requirements thereof. In a vehicle embodying our invention, disclosed and claimed in this application, lugs 16 and 18 serve an additional purpose, namely as part of the truss structure that inhibits roll about axis 10. In a vehicle subjected to extremely difficult terrain, it will be advantageous to enlarge collar or flange 14 so as to provide a greater lateral spacing between lugs 16 and 18 than would be necessary for a Gamaunt vehicle not provided with the rigidizing trusses proposed by this invention. Because such a modification is well within the ability of a man of ordinary skill in the art, it need not be detailed here.

To provide points of securement for the rigidizing trusses referred to above, flange 14 is provided with tapped holes just forward of the pitch axis 20, one of which is shown at 24 in the lug 16 and it will be understood that another such tapped hole is located directly opposite 24 in the lug 18. Threaded pins or cap screws, one of which is shown at 26 in FIG. 5, are provided to secure the truss triangles to flange 14 by means of tapped holes 24.

Figure 2:
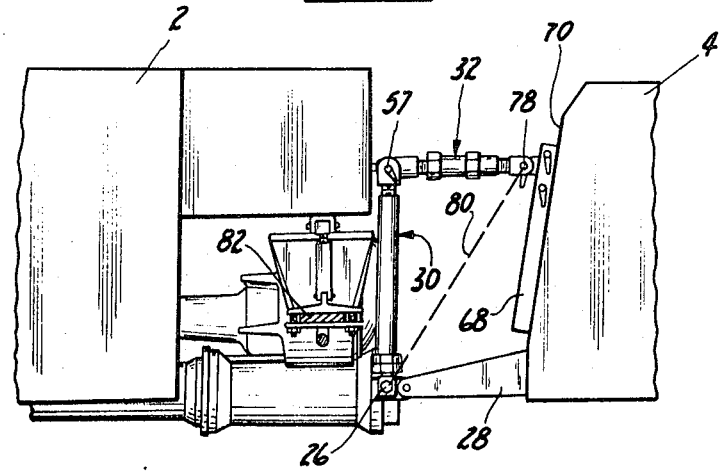
FIG. 2 is a side elevation view of a portion of the vehicle showing the invention on a larger scale and in more detail than FIG. 1, with parts broken away.
Figure 3:
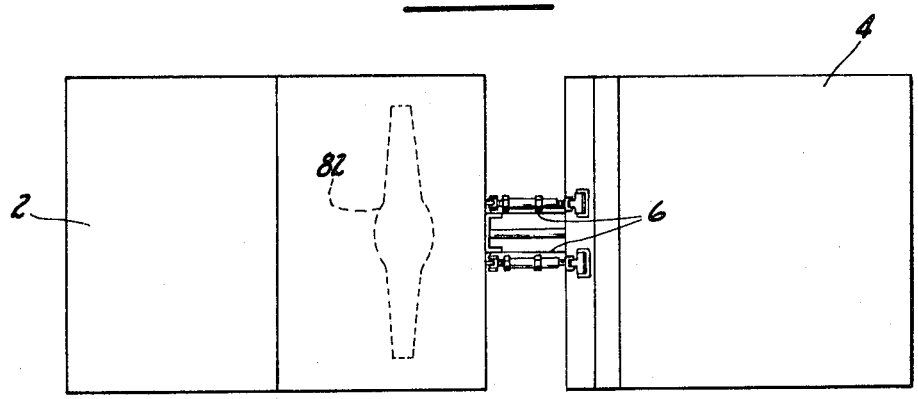
FIG. 3 is a top plan view of the vehicle shown in FIG. 1.

One of the truss triangles is illustrated in exploded detail in FIG. 5 and is shown assembled with the forward and rear parts in FIG. 2. As the Gamaunt patent indicates (column 7) the rear part 4 of the two-part vehicle is provided with a pair of forward-extending arms (FIG. 6 of Gamaunt's patent, FIG. 2 of our application drawings), one of which we show at 28 in our FIG. 2. Arms 28 preferably lie outside lugs 16 and 18 to increase the lateral spacing between arms 28, and suitable pins make the pivot connection between arms 28 and openings 22 in each of lugs 16, 18. One of the pins is shown at 22 of the Gamaunt patent, FIG. 6 and is referred to in the patent text, column 3, line 69.

Referring now in more detail to FIG. 5, it is seen that two sides of the triangle are formed by truss elements 30 and 32. Element 30 comprises an internally threaded metal sleeve 34 which has a hexagonal piece 36 formed integral therewith at its lower end. An externally threaded stem 38 engages the internal thread of sleeve 34 and a lock nut 40 on stem 38 helps to hold the parts 34, 38 in their adjusted length relationship. Half of a clevis 42 is secured to stem 38 and is bored at 44 freely to receive cap screw 26 when it engages tapped hole 24 (FIG. 4).

Element 30 is provided at its upper end with a clevis 46 having an externally threaded stem 48 in engagement with the internal thread of sleeve 34. Clevis 46 is adapted to encompass a narrower clevis so at the left (as seen in FIG. 5) end of truss element 32. Clevis 50 in turn receives an eye 52 between its bifurcations, and eye 52 bears a stem 54 which has threaded engagement with a suitable opening in the rear panel 56 of the forward part 2 of the vehicle. A pin 57 engages clevis 46, clevis 50, and eye 52 to hold them in assembled position.

Clevis 50 is part of element 32 as aforesaid, and element 32 is a turnbuckle having a sleeve 58 which is provided at one end with a right-hand internal thread and at its other end with a left-hand internal thread. A hexagonal portion 60 intermediate the ends of sleeve 58 provides a place for the operator to apply a wrench to shorten or lengthen the turnbuckle by turning it one way or the other. A lock nut 62 on the stem of clevis 50 can be tightened against the end of sleeve 58 to secure the turnbuckle in its adjusted length.

At its right end, the internal thread of sleeve 58 engages an externally threaded stem 64 of a clevis 66. A channel 68 is secured as by welding to the front face 70 (FIG. 2) of rear part 4 of the vehicle. A block 72 is adapted to be held in place in the channel by pins 74 and 76. A pin 78 secures clevis 66 to block 72.

The foregoing describes one of the truss structures and it will be understood that there is a substantially identical structure on the other side of the roll axis. Reference to FIG. 2 best illustrates the triangular geometry of a truss structure according to this invention. Element 30 forms one side of the triangle and element 32 another. The third side is in effect the structure of rear part 4 and is represented schematically by dotted line 80 in FIG. 2. The three corners are represented by pins 26, 57 and 78.

FIG. 6 details the structure that enables operation of the vehicle without one or both ground-contact members of the intermediate axle. We have referred above to a difference between the vehicle of Gamaunt's patent and to the design here disclosed in that we have disclosed a semi-elliptic spring 82 to suspend the wheels of the intermediate axle.

To keep the intermediate axle from pushing down in response to the bias of spring 82, a tension member 84 is provided comprising an upper terminal block 86, a link 88, and a clamp 90. Block 86 is adapted to be pinned to a socket 92 on the underside of the associated vehicle part, pin 94 being shown for that purpose. Block 86 has a threaded stem 96 which engages a threaded opening in link 88 for adjustment of the length of tension member 84. Clamp 90 is pinned to the link 88 by a pin 98. The clamp consists of upper and lower elements 90a and 90b held together by studs 100 and nuts 102.

OPERATION

Truss element 30 is conventionally attached first by pinning half-clevis 42 to its lug 16 or 18 by means of pin 26. With eye 52 in place, the length of element 30 is adjusted by means of the threaded connections 38 and 48 with sleeve 34, whereupon clevis 50, eye 52, and clevis 46 are connected by pin 57. Turnbuckle 32 is adjusted to the proper length, and clevis 66 is secured to block 72 by pin 78. Both truss structures are secured as indicated.

Thereupon, one end of the intermediate axle is raised by conventional jack means. Clamp 90 is secured to the raised end of spring 82 and is pinned to link 88 by pin 98. Block 86 is turned to adjust the length of member 88; block 86 is then secured in socket 92 by pin 94. Both wheels may be raised in this manner for operation on conventional highways to reduce wheel and tire wear; or this expedient may be used so that a wheel of the intermediate axle may replace a front or rear damaged wheel.

In the embodiment shown, one corner of the triangle, represented by pin 57, is secured to the part which defines the roll axis, this being part 2, while the remaining two corners are secured to the part which, without the triangles, rolls about that axis; here that is part 4. Without the rigidizing provided by the truss triangles, lugs 16 and 18 may move relative to rear panel 56. Truss elements 30 prevent such movement when the triangles are in place. Thus, elements 30 prevent oscillation about the roll axis 10, and elements 32, braced between parts 2 and 4, prevent movement about pitch axis 20.

We wish it to be understood that we do not desire to be limited to the exact details of construction shown and described, for obvious modifications will occur to a person skilled in the art.

What is claimed is:

1. A three-axle vehicle having two carriers articulated to provide pitch and roll of one carrier relative to the other, means to provide a rigid connection between the carriers to substantially eliminate the pitch and roll capabilities, said means being attachable and removable for the purpose of keeping the vehicle in operation under emergency conditions, and means to hold the wheels of the middle axle off the ground.

2. A three-axle vehicle having two carriers, articulation means connecting the two carriers to permit both pitch and roll of one carrier relative to the other, one of the three axles being adjacent the outer end of one carrier, another axle disposed beneath the other carrier, and the third axle disposed intermediate the other two, means for rigidly connecting the two carriers whereby the pitch and roll capabilities are eliminated, the last named means being attachable and removable for the purpose of keeping the vehicle in operation under emergency conditions, and means to hold the wheels of the middle axle off the ground.

3. A vehicle as in claim 2, wherein the intermediate axle carries a pair of ground-engaging members, means providing resilient suspension of said members, and means to hold an individual member against movement in response to the bias of said suspension.

4. A vehicle as in claim 3, wherein the last-named means includes a clamp to engage the suspension.

5. A vehicle as in claim 4, said last-named means including also a member in tension connecting the clamp with an adjacent portion of the carrier to which the suspension is secured.

6. A vehicle as in claim 5, wherein the roll axis is fixed relative to one of the carriers and the other carrier rolls about said axis.

7. A three-axle vehicle having two carriers, articulation means connecting the two carriers to permit both pitch and roll of one carrier relative to the other, one of the three axles being adjacent the outer end of one carrier, another axle disposed beneath the other carrier, and the third axle disposed intermediate the other two, and means for rigidly connecting the two carriers whereby the pitch and roll capabilities are eliminated, the last-named means including at least one triangular structure in which two angles are secured to one carrier and the third angle is secured to the other carrier.

8. A vehicle as in claim 7, wherein the rigidly connecting means includes two said triangular structures, one on each side of a vertical plane through the roll axis.

9. A vehicle as in claim 8, in which each triangular structure includes two rigid members each of which is connected with both carriers, one of said rigid members being a turnbuckle.

10. A vehicle as in claim 9, wherein the intermediate axle carries a pair of ground-engaging members, means providing resilient suspension of said members, and means to hold an individual member against movement in response to the bias of said suspension.

11. A vehicle as in claim 10, wherein the last-named means includes a clamp to engage the suspension.

12. A vehicle as in claim 11, said last-named means including also a member in tension connecting the clamp with an adjacent portion of the carrier to which the suspension is secured.

13. A vehicle as in claim 12, wherein the roll axis is fixed relative to one of the carriers and the other carrier rolls about said axis, one of the angles of the triangular structure being secured to the carrier to which the roll axis is fixed and the remaining two angles being secured to the other carrier.

14. A vehicle as in claim 7, wherein the roll axis is fixed relative to one of the carriers and the other carrier rolls about said axis, one of the angles of the triangular structure being secured to the carrier to which the roll axis is fixed and the remaining two angles being secured to the other carrier.

* * * * *